Sept. 21, 1948.  E. FROELICH  2,449,694
EYEGLASS

Filed Nov. 9, 1945  2 Sheets-Sheet 1

INVENTOR.
Edward Froelich
BY  C. P. Goepel
his ATTORNEY

Sept. 21, 1948.  E. FROELICH  2,449,694
EYEGLASS
Filed Nov. 9, 1945  2 Sheets-Sheet 2
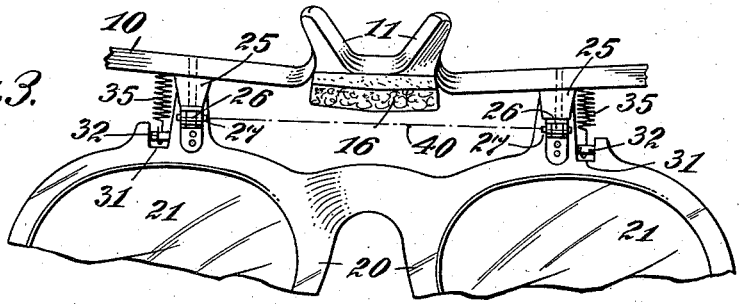
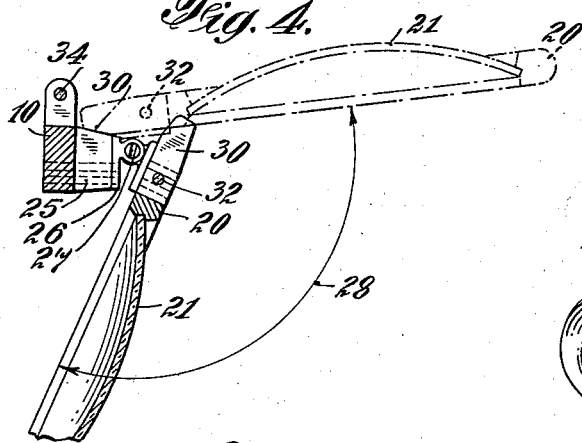
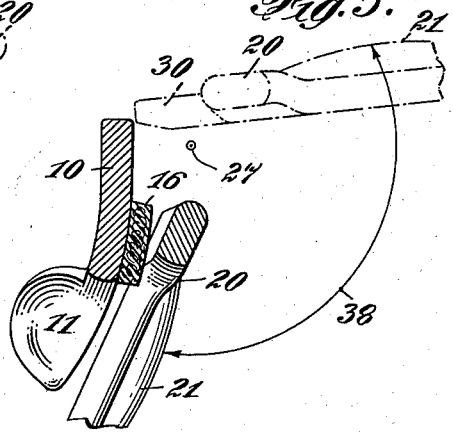
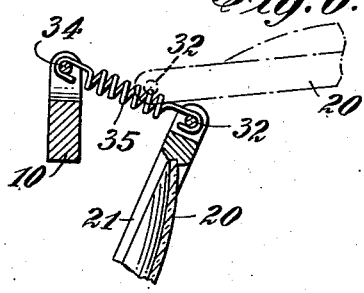
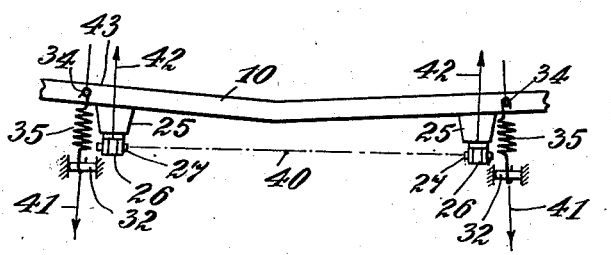
INVENTOR.
Edward Froelich
BY C. P. Goepel
his ATTORNEY Patented Sept. 21, 1948

2,449,694

UNITED STATES PATENT OFFICE 2,449,694

EYEGLASS

Edward Froelich, New York, N. Y.

Application November 9, 1945, Serial No. 627,656

1 Claim. (Cl. 2—14)

This invention relates to eyeglasses, and more particularly to such as are intended for glare or sun protection. In the use of such glasses, it frequently happens that use is desired to be made of them, only when the eyes are directed to the source or direct reflection of the glare. It is essential to dispose such glasses in non-use position, so as to be immediately accessible when desired to be used.

Attempts have been made to solve the difficulties attendant such non-use and instantaneous use positions of the lenses, but in one form in which the pair of lenses were applied to the visor of a cap, the transposition of the positions was so uncertain that the glasses were soon discarded, and in the other form, the bridge piece bent and gave an insecure operation.

The object of the invention is to surmount these difficulties and provide a pair of lenses, which may be quickly moved from non-use to use position or vice versa, and be at all times true in the position desired.

The invention consists of a bridge piece of suitable stability, having a pair of spaced abutments, each provided with a hinge member, connected with its companion hinge member secured to the lens frame, preferably to hinge supporting extensions thereof, and having a coil spring closely adjacent to each of said hinge members, one end of each spring being supported on the bridge member, and the other end of each spring being supported on the lens frame, the spring acting as part of a toggle member at opposite sides of the pintle of the hinge. By arranging the springs close to the hinges, the hinge connection takes up some part of the strain exerted by the tensions of the springs, and thereby the hinge members are maintained in true positions, and the bridge member is maintained free from bending, which bending would transpose the positions of the hinges, and warp the bridge member in relation to the lens member. The parts as arranged provide a sudden movement to either non-use or use position of the lens frame, after the most gentle initial movement of the lens frame.

The invention will be further described, embodiments shown in the drawings, and the invention will be finally pointed out in the claim.

In the accompanying drawings,

Fig. 3 is a view of the underside of part of the lens frame and bridge support, shown in Fig. 2;

Fig. 4 is a vertical section taken on line 4—4 of Fig. 1;

Fig. 5 is a vertical section taken on line 5—5 of Fig. 1;

Fig. 6 is a vertical section taken on line 6—6 of Fig. 1, and

Fig. 7 is a diagrammatic plan view of forces operating in the improved device.

Similar letters of reference indicate corresponding parts throughout the drawings.

Figure 1:
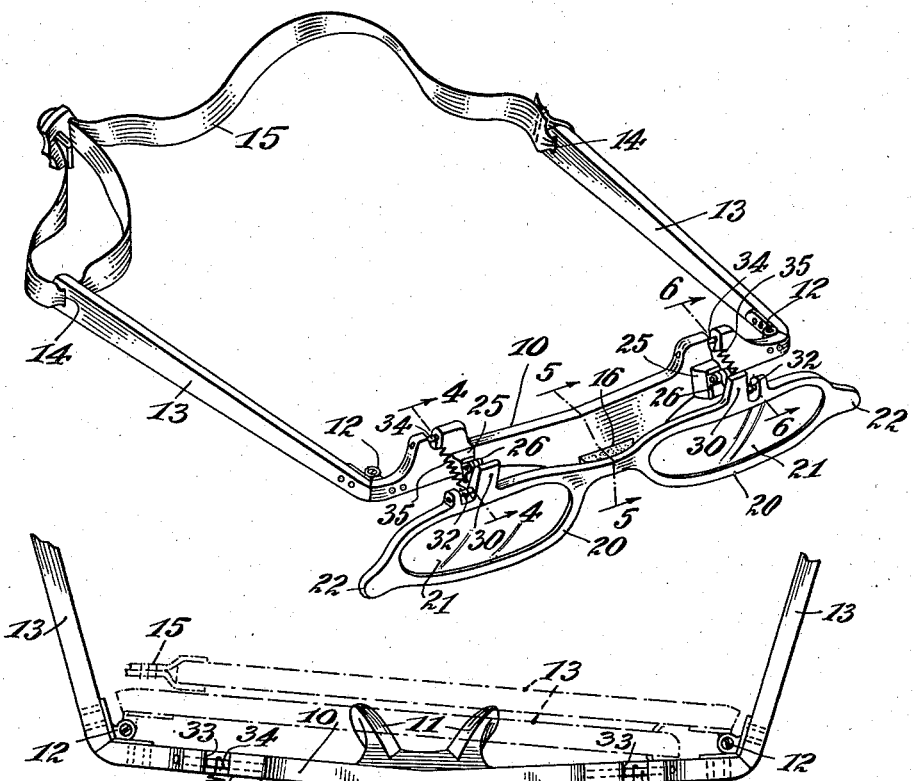
Fig. 1 is a perspective view of the eyeglass frame, bridge support, and supporting means.

Referring to the drawings, the bridge piece 10, has supports 11 adapted to rest on the nose of the user and has a hinge 12 at each end to pivotally support side pieces 13, which in the embodiment shown in Fig. 1 has slots 14 for the passage of an adjustable band 15. Instead of the side pieces and band, the usual bows may be used. At the front of the bridge piece, a cushioning member 16, in the form of a layer of felt is applied by an adhesive.

The lens frame 20 encloses glasses 21 of light screening type. At each end portion of the lens frame 20, projections 22 are arranged, to enable the lens frame to be moved by the tipping of a finger of the user.

Figure 2:
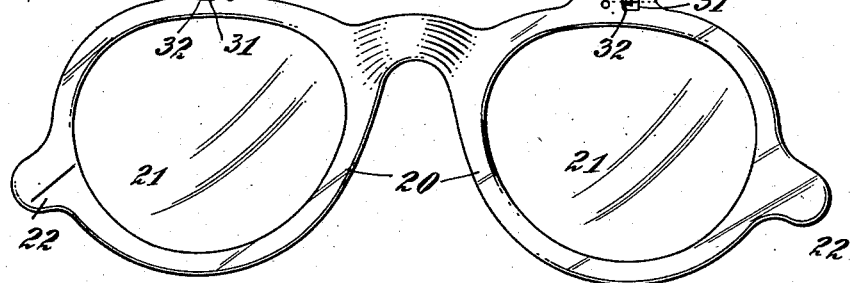
Fig. 2 is a plan view with the lens frame in non-use position.

The invention consists in the combination of parts which enables the lens frame 20 to be tipped into non-use position, as shown in Fig. 2, and securely held in that position; or to be tipped into use position as shown in Fig. 1, and securely held in that position; the parts being so arranged as to assure trueness in the respective positions, even after considerable use.

To carry out the operation of this combination of parts, these parts in the embodiment shown consist of a pair of spaced abutments 25 along the front side of the bridge piece 10, to which one part of a hinge 26 is secured, the other part of the hinge being secured to the rear side of the lens frame 20. The pintle of the hinge members is indicated by 27.

The lens frame 20 at the hinge 26, is provided with a projection 30, which extends from the lens frame 20 to the front wall of the bridge piece 10, when the lens frame is in the position shown in Fig. 2, that is, in the non-use position. It has a thickness so that its lower portion rests on the top of the abutment 25.

Immediately adjacent the projection 30, the lens frame 20 is provided with a cutout 31, having a spaced bar 32. This cut out is immediately adjacent to the hinge 26, and at the outer side of it. The bridge piece 10 is also provided with a cut out 33, having a spaced bar 34. A coil spring 35, has one end bent around the bar 34 and the other end bent around the bar 32. The longitudinal axis of the spring is at one side of the pintle 27, when the lens frame is in use position and is at the other side of the pintle 27 when the lens frame is in non-use position. This relationship may be seen in Fig. 4, which for clarity omits the spring. It will be noted that the distance of the straight line between the bars 32 and 34 from the pintle 27 when the lens frame is in use position, is considerably less than between straight line and the pintle 27, when the straight line is above the spindle 27 (Fig. 4). In consequence of this toggle action, a very small movement of the lens frame from its use position, will cause it to be quickly moved into non-use position, as indicated by the arc 28 in Fig. 4. The momentum of movement is taken up by the extension 30 acting on the abutment 25; and due to the spring the lens frame is held in non-use position.

By placing the spring immediately adjacent to the hinge, and at the outer side thereof, the leverage exerted upon the bridge piece is very small, or negligible, assuring the bridge piece 10 being maintained in its rigid position, without bending the same. The bridge piece may be strengthened either by thickened material, or by a reinforcing member applied internally in the molding, or externally. The bridge piece 10 as shown is slightly curved. The axis 40 of the pintle 27 (Fig. 3), forms at each end an acuate angle with the axis of each spring, as shown in Fig. 3. The axis of each spring is at right angles to the portion of the bridge piece to which the end of the spring is applied. In Fig. 7, the arrow 41 shows a pull in one direction, and the arrow 42 shows a resistance force, the space 43 on the bridge piece 10 between the arrows being as small as practicable.

It will be noted that a pair of spaced abutments are arranged on the bridge piece, with which a pair of spaced projections on the lens frame cooperate, and that at each outer side of said abutment and projection and close thereto, a coil spring connects the bridge piece and lens frame, with the axis of the coil spring being once above and once below the axis of the pintles of the hinges connecting the bridge piece and lens frame. Moreover, the spring axes are perpendicular to the bridge piece.

I have described several forms of my invention, but obviously various changes may be made in the details disclosed without departing from the spirit of the invention as set out in the following claim.

I claim:

In an eyeglass having a rigid bridge piece with means for holding the bridge piece at the front portion of the head of the wearer, and having a bridge to rest on the nose of the wearer, a pair of spaced forwardly extending abutments on the bridge piece, a lens frame, a pair of spaced pintle hinges connecting the lens frame with the bridge piece, said pintles being in alignment with each other and substantially parallel with the bridge piece and the lens frame, and a pair of spaced projections on the lens frame resting on said abutments in the non-use position of the lens frame, the combination of a pair of spaced upwardly extending pairs of projections on the bridge piece, each latter pair above each abutment, and each pair having a horizontal bar, a pair of horizontal bars on said lens frame with each bar adjacent one of said lens frame projections and supported thereby, and each bar substantially parallel with one of said bridge piece bars, a member at the front of the bridge piece centrally of the same against which the lens frame abuts when in use position, and a pair of coiled springs, each having one end connected with a bridge piece bar and the other end with a lens frame bar, disposed close to each hinge, the longitudinal axis of each spring being disposed below the pintle axis when the lens frame is in use position, and being disposed above the pintle axis when holding the lens frame in non-use position, whereby the lens frame is held by the spring against the bridge piece when in non-use position, and held by the spring against the bridge piece when in use position.

EDWARD FROELICH.

REFERENCES CITED

The following references are of record in the file of this patent:

UNITED STATES PATENTS

| Number | Name | Date |
|---|---|---|
| 1,182,367 | Gravell | May 9, 1916 |
| 1,285,225 | King | Nov. 19, 1918 |
| 2,060,127 | Schofield | Nov. 10, 1936 |
| 2,187,932 | Cornell | Jan. 23, 1940 |

FOREIGN PATENTS

| Number | Country | Date |
|---|---|---|
| 645,124 | France | June 26, 1928 |